United States Patent [19]
Herby et al.

[11] Patent Number: 4,809,349
[45] Date of Patent: Feb. 28, 1989

[54] METHOD OF AUTOMATICALLY EXTRACTING A CONTRASTING OBJECT IN A DIGITAL IMAGE

[75] Inventors: Gérard Herby, Le Kremlin Bicetre; Serge Legall, Paris, both of France

[73] Assignee: U.S. Philips Corporation, New York, N.Y.

[21] Appl. No.: 79,549

[22] Filed: Jul. 29, 1987

[30] Foreign Application Priority Data

Jul. 30, 1986 [FR] France ................... 86 11031

[51] Int. Cl.$^4$ .............................................. G06K 9/38
[52] U.S. Cl. ..................................................... 382/50
[58] Field of Search ...................... 382/50, 51; 358/282

[56] References Cited

U.S. PATENT DOCUMENTS 4,220,972  9/1980  Geokezas et al. .................. 358/113
4,661,849  4/1987  Hinman ............................... 358/105
4,719,584  1/1988  Rue et al. ............................ 358/126

Primary Examiner—Theodore M. Blum
Attorney, Agent, or Firm—Marianne R. Rich

[57] ABSTRACT

Method for extracting a contrasting object in a digital image. The method estimates a threshold $S_1$ for each picture element, corresponding to a background estimation threshold representing an image contrast. A local contrast function $GR(i,j)$ is determined as a recursive gradient proportional to the difference between the average of a video signal on the line of each picture element, and a function of the averages of the estimated background contrasts and picture elements located on an identical line or a previous line. Using the local contrast function, an estimated background value for each element is determined by comparing the contrast function to the threshold. The difference is taken between the video signal and the estimated background. The result of this difference is compared to a second decision threshold to determine whether or not the picture element belongs to the contrasting object.

8 Claims, 2 Drawing Sheets

METHOD OF AUTOMATICALLY EXTRACTING A CONTRASTING OBJECT IN A DIGITAL IMAGE

The present invention relates to a method of automatically extracting a contrasting object in a digital image. In the context of this application contrasting object must be understood to mean an object which, in the relevant frequency band, has an intensity which is higher or less than the average intensity of the background against which it is placed.

The technical problem to be solved by any method of automatically extracting a contrasting object in a digital image is to allow extraction of said contrasting object from the background in which it is placed with a highest possible detection probability and the smallest possible probability of false alarm. To that end it is necessary to estimate the background in each picture element with a maximum of precision. More specifically in those picture elements forming the object to be extracted, the corresponding video signal and the respective contributions of the object itself and of the are distinguished, by unknown hypothesis. Thereafter, when the background has been evaluated, it is necessary to determine if the difference between the video signal in a picture element and the associated background value is sufficiently high for this picture element to be considered as belonging to the object to be extracted. In that respect, a solution of the above-mentioned technical problem is given in the article "Autothreshold-Autoscreener/FLIR System" presented at NEACON 78 and published by IEEE CH 1336-7/78/0000 pp. 1180-1185. This document of the prior art actually describes a method of automatically extracting a contrasting object in a digital image which more specifically consists in estimating a background value in each picture element. This estimation makes use of a first threshold which is representative of a local contrast of the image, proportional to the horizontal average of the absolute values of the differences between the video signals of the picture elements situated in the relevant picture element line and video signals of the corresponding picture elements situated in the preceding line. This background estimation threshold then depends on the line of the relevant picture element and must continuously be reevaluated line-sequentially. The estimated background value in each picture element is then evaluated in a different manner, depending on the result of the comparison of said background estimating threshold of a local contrast function, which in the known method, is a vertical difference between the video signals of the relevant picture element and the picture element located immediately thereabove. If in the event of a high contrast, the local contrast function exceeds the background estimating threshold, the estimated background for the relevant picture element is taken equal to the estimated background in a picture element nearest thereto in accordance with a procedure referred to as unidirectional propagation of the background. If on the other hand the contrast is low, the local contrast function falls short of the background estimation threshold and the estimated background for the relevant picture element is taken equal to a weighted average of the video signal in the relevant picture element and of the estimated background in a picture element nearest thereto. Thereafter, after having estimated the background, the difference between the video signal and the estimated background is compared to a second threshold, referred to as the decision threshold, so as to decide whether the relevant picture element is a candidate picture element of the object to be extracted. The decision threshold given in the above document describing the prior art is proportional to the horizontal average of the absolute value of the differences between the estimated backgrounds for picture elements situated in the relevant picture element line and backgrounds estimated for the corresponding picture elements situated in the preceding line.

However, the proposed solution of the technical problem given in the prior art document has the drawback that, in certain cases, the estimated background for the relevant picture element may be overvaluated, thus introducing an error in the final decision as to whether the relevant picture element belongs or does not belong to the object to be extracted. Actually, when the relevant picture element and its nearest picture elements are situated in a zone of said object to be extracted having a low-contrast video signal level, the function of the local contrast assumes a very low value, or even zero value, less than the background estimation threshold. As indicated in the foregoing, the estimated background value for the relevant picture element is then taken equal to a linear combination of the estimated background of a neighbouring picture element and the video signal of the relevant picture element, which results in an over-estimation of the background and in a propagation of this error, taking account of the recursive character of the method. As the background is overevaluated, the difference between the video signal and the background may consequently be underestimated to such a high extent that it falls short of the decision threshold, and the relevant picture element, although belonging to the object to be extracted is not recognized as such.

On the other hand the known, prior art procedure has the further drawback that the estimated background in a given picture element is a function of a single previously estimated background in a single neighbouring picture element. Put differently, the propagation of the background is only unidirectional without taking the estimated background for the other elements of neighbouring pictures into account. In addition, the local contrast function is also unidirectional (vertical in the case of interest to us).

Finally, a further disadvantage of the known procedure is the fact that it requires frequent line-sequential updating of the background estimating threshold and the decision threshold.

The general technical problem to be solved by the present patent application is to propose a method of automatically extracting a contrasting object in a digital image, constiting on the one hand in estimating in each picture element a background value, this estimation making use of a first threshold, referred to as the background estimation threshold which is representative of an image contrast, rendering it possible to assign to the relevant picture element a background estimated in a different way depending on the result of comparing to said first threshold a local contrast function calculated for the relevant picture element and on the other hand in comparing in each picture element the difference between the video signal and the estimated background to a second threshold, referred to as the decision threshold which is also representative of an image contrast, in order to decide whether the picture element is a candidate picture element of the objects to be extracted. This is effected with the aid of a better adapted local contrast function which more specifically does not result in an over-evaluation of the background in low-contrast zones of the object to be extracted. In one specific mode of making the method operative, it is the aim to assign to the relevant picture element a background estimated on the basis of the evaluated background for groups of neighbouring picture elements so as to realise a multi-directional propagation of the background. Finally, a very special mode of making the method operative ensures that a too frequent updating of the background estimation threshold and the decision threshold is avoided.

This general technical problem is solved, in accordance with the present invention, in that said local contrast function is a gradient, referred to as the recursive gradient, which is proportional to the absolute difference between an average of the video signals of the picture elements located in the line on which the relevant picture element is located and a function of the averages of the estimated backgrounds in picture elements located in at least one identical line or a line preceding the line in which the relevant picture element is located.

The local contrast function according to the invention consequently presents itself schematically as a difference between the video signals and the estimated backgrounds, taken from neighbouring picture elements. This function is very appropriate for the problem posed, particularly when the picture elements taken into account are located in a low-contrast zone of the object to be extracted. In that case the local contrast function actually assumes a relatively high value, higher than the background estimating threshold, as a result of which the relevant picture element is considered to belong to the object to be extracted rather than to the background, and consequently a background value is assigned to it independently of the video signal in this picture element. Pure more precisely, in the particular mode of making the method operative it is provided that, on the one hand if said recursive gradient exceeds the background estimation threshold, the estimated background for the relevant picture element expressed as a function of the average values of the estimated background utilized in the calculation of the recursive gradient, and on the other hand if said recursive gradient falls short of the background of the estimation threshold, the background estimation for the relevant picture element is taken equal to a linear combination of the video signal of the relevant picture element and the average values of the estimated backgrounds utilized in the calculation of the recursive gradient. Thus, an estimation of the background is obtained which depends on the estimated background in a plurality of adjacent picture elements, and not only on one picture element, hence the possibility to estimate the background in several directions, referred to as the background propagation directions. By way of example, let it be assumed that said recursive gradient is calculated on the one hand at the left with the aid of at least one average value of the estimated backgrounds in the left-hand picture elements, that is to say preceding the relevant picture element and located in the same line, and on the other hand at the right with the aid of at least one average value of the estimated backgrounds in right-hand picture elements, that is to say subsequent to the relevant picture element and located in the same line, and in that, each left-hand recursive gradient and right-hand recursive gradient defining an estimated background at the left and an estimated background at the right respectively, the final background estimated for the relevant picture element is taken equal to that one of these two estimated backgrounds at the left and at the right which has the smallest difference in absolute value with respect to the video signal of the relevant picture element.

Finally, in the most specific mode of putting the method into effect, intended to avoid the line-sequential updating of the background estimating threshold and the decision threshold, it is provided that, the picture being divided into sub-pictures which overlap each other only partially, the background estimation threshold and the decision threshold are proportional to a function of the average values of each sub-picture of a characteristic value of the contrast in each picture element of the relevant sub-picture.

This arrangement has the further advantage that the background estimation threshold and the decision threshold are simultaneously calculated on the basis of the same statistic average.

The following description which is given by way of non-limitative example with reference to the accompanying drawings will make the invention and how it can be put into effect better understood.

Figure 1:
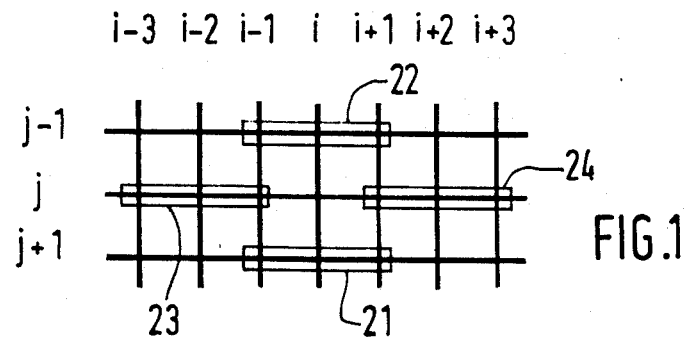
FIG. 1 shows a frame portion of a digital image, centred on a relevant picture element.
Figure 2:
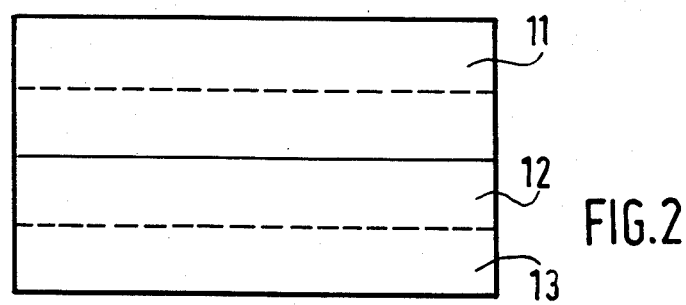
FIG. 2 shows a division of the digital image into secondary sub-pictures.

FIG. 1 shows a frame portion of a digital picture from which one wants to extract automatically a contrasting object contained therein, this extraction being realized by means of a method which more specifically consists, in a first time interval, in estimating a background value $f(i,j)$ in each picture element $(i,j)$. To that end it is necessary to define a first threshold $S_1$ referred to as the background estimation threshold, which is representative of a contrast in the picture, allowing to assign to the picture element $(i,j)$ a background $f(i,j)$ estimated in a different manner according to the result of the comparison to said background estimation threshold $S_1$ of a local contrast function $GR(i,j)$ calculated for the relevant picture element $(i,j)$. So as to avoid the necessity of continuously updating the background estimation threshold $S_1$ this threshold is defined for the total overall picture in the following manner. As is shown in FIG. 2, the picture is first divided into, for example, 3 sub-pictures 11, 12, 13 which partially overlaps, here for half their size. Thereafter, in each picture element $(i,j)$ of each sub-picture k ($k=1, 2, 3$), a quantity $C_k(i,j)$ is calculated which is characteristic of the contrast to the picture. This quantity $C_k(i,j)$ may be taken equal to the absolute value of the result of the convolution in $(i,j)$ of the digital picture by the horizontal gradient operator of the Sobel type:

$$H = \begin{vmatrix} -1 & 0 & 1 \\ -2 & 0 & 2 \\ -1 & 0 & 1 \end{vmatrix}$$

or by the equivalent vertical operator $$V = \begin{vmatrix} -1 & -2 & -1 \\ 0 & 0 & 0 \\ 1 & 2 & 1 \end{vmatrix}$$

or also to the highest of these absolute values or their average value. The above operators H and V are applied to the vidoe signal S (i,j) without filtering or after low-pass filtering with the aid of another convolution operator of the following shape:

$$(1/16) \begin{vmatrix} 1 & 2 & 1 \\ 2 & 4 & 2 \\ 1 & 2 & 1 \end{vmatrix}$$

Thereafter, in each sub-picture k the average $m_k$ of the values of the quantity $C_k(i,j)$ is calculated for all the picture elements (i,j) contained in the sub-picture k:

$$m_k = (1/N) \sum_{i \cdot j} C_k(i \cdot j)$$

where N is the number of picture elements in each sub-picture.

Finally, a global value M is calculated for the total overall picture from the partial averages $m_k$. It is possible to take, for example, the highest of the partial averages $m_k$ for M:

$$M = Sup \, (m_k)$$

It would also be possible to take the simple average of $m_k$ or any other combination as the value for M.

The average M thus being defined and calculated, the background estimation threshold $S_1$ is chosen proportional to this average M:

$$S_1 = k_1 M$$

where $k_1$ is a statistically determined constant.

The local contrast function GR(i,j) utilized for the background estimation f(i,j) in the picture element (i,j) is a gradient, the recursive gradient, which is proportional to the absolute value of the difference between an average value MV(j+1) of the video signals (prefiltered or not prefiltered) of the picture elements located on a line j+1 succeeding the line j of the relevant picture element and of an average value MF (j; J−1) of the averages MF(j), MF(j−1) of the estimated backgrounds in the picture elements located in at least one identical line j or a line j−1 preceding the line j considered here. For example, with reference to FIG. 1, it is possible to take for the calculation of MV (j+1) the 3 picture elements within a box 21, and to take the weighted average of their respective video signals, that is to say:

$$MV(j+1) = s(i-1,j+1) + (i,j+1) + s(i+1,j+1)$$

Similarly, for the calculation of MF(j−1) it is possible to choose the picture elements of a box 22, which gives $$MF(j-1) = f(i-1,j-1) + 2f(i,j-1) + f(i+1,j-1)$$

If the backgrounds estimated for the preceding line is sufficient, then:

$$MF(j;j-1) = MF(j-1) \text{ and:}$$

$$GR(i,j) = |MV(j+1) - MF(j;j-1)| = |MV(j+1) - MF(j-1)|$$

But it is also possible to calculate a background average value MF(j) from the estimated backgrounds in the picture elements located in the same line j as the picture element under consideration, which are the picture elements contained in boxes 23 and 24 of FIG. 1. By way of example, MF(j) is evaluated from the elements of box 23 (left-hand block) by means of the formula:

$$MF(j) = f(i-3,j) + f(i-2,j) + 2f(i-1,j)$$

Having now the estimated background average values MF(j) and MF(j−1), MF(j;j−1) is now calculated as a simple or weighted average of MF(j) and MF(j−1), and more specifically by choosing that average of the two average values MF(j), MF(j−1) which minimises the difference MV−MF, in absolute value $$GR(i,j) = INF \, [|MV(j+1) - MF(j)|, \\ |MV(j+1) - MF(j-1)|]$$

is obtained.

Having defined the local contrast functions GR(i,j) and the background estimation threshold $s_1$ it is possible to effect a background estimation f(i,j) by comparing these two quantities.

If the recursive gradient GR(i,j) exceeds the threshold $S_1$, the estimated background (i,j) for the relevant picture element (i,j) is expressed as a function of the averages MF(j) and MF(j−1) of the estimated backgrounds previously utilised for the calculation of the recursive gradient GR(i,j). More specifically the estimated background f(i,j) loocked for may be taken equal to that of the two average values MF(j) and MF(j−1) having the highest difference in absolute value with respect to the video signal s(I,j) of the relevant picture element s(i,j).

If the recursive gradient GR(i,j) falls short of the threshold $S_1$ the estimated background f(i,j) for the picture element (i,j) is taken equal to a linear combination of the video signal s(i,j) and the averages MF(j) and MF(j−1) defined in the foregoing.

In a specific example of putting the method into effect, the average between the video signals f(i,j) and the one of the average values MF(j) and MF(j+) that has the smallest difference in absolute values with respect to the video signal s(i,j) might be taken for the background f(i,j).

In the foregoing it has been suggested that the average MF(j) can be calculated from the picture element situated to the left or to the right of the relevant picture element. With this particular background estimation method two types of background estimation are possible, one referred to as to the left and the other one referred to as to the right, consisting in a left or right-hand propagation of the background. One single background estimation, left or right, may in certain cases result in significant errors between the background thus estimated and the real background. This is more specifically the case when the background to the left and to the right of the object to be extracted has very different video levels. For that reason it should be preferred to calculate the recursive gradient GR(i,j) on the one hand to the left GRG(i,j) with the aid of an average value MFG(j) of the estimated background in picture elements located to the left of the relevant picture element, and on the other hand to the right GRD(i,j) with the aid of an average value MFD(j) of the background estimated for picture elements located to the right of the picture element. It is for example possible to have $$GRG(i,j) = \text{Inf}\,[|MV(j+1) - MFG(j)|, |MV(j-1) - MF(j-1)|]$$

and $$GRD(i,j) = \text{Inf}\,[|MV(j+1) - MFD(j)|, |MV(j+1) - MF(j-1)|]$$

where $$MFG(i,j) = f(i-3,j) + f(i-2,j) + 2f(i-1,j)$$

and $$MFD(j) = 2f(i+1,j) + f(i+2,j) + f(i+3,j)$$

The recursive gradient at the left, for example, can also be calculated with the aid of the average value MFG(i−1) of the background to the left in the line j−1 and the average value MV(j) of the video signals on the line j:

$$GRG(i,j) = \text{Inf}\,[|MV(j) - MFG(j)|, |MV(j) - MFG(j-1)|]$$

These two recursive gradients GRG(i,j) and GRD(i,j) render it possible to define an estimated background to the left fg(i,j) and an estimated background to the right fd(i,j). The final background f(i,j) is then taken equal to that background of these two estimated backgrounds to the left and to the right which has the lowest difference in absolute value with respect to the video signal s(i,j) of the relevant picture element.

The background estimation method described in the foregoing is based on the calculation of a recursive gradient which requires an initialisation. To that end, the values of the video signal is taken as the values of the estimated background for the picture elements located in the first line and the first and last columns of the picture, in these picture elements. Put differently, it will be assumed that the first lines and the first and last columns contain only a background and not the object to be extracted.

In a second large step, after the estimation of the background f(i,j), the proposed method consists in comparing the difference d(i,j) between the video signals s(i,j) (prefiltered or not prefiltered) and the estimated background f(i,j) to a second threshold $S_2$ referred to as the decision threshold. This threshold $S_2$ is, as is also the background estimation threshold $S_1$, proportional to the average M defined in the foregoing:

$$S_2 = k_2 M$$

where $k_2$ is also a statistically determined constant. In practice $k_2$ will be greater than $k_1$.

If the difference d(i,j) exceeds the decision threshold $S_2$ the picture element (i,j) is considered as being a candidate picture element of the object to be extracted. On the other hand, if d(i,j) falls short of $S_2$ the corresponding picture elements will not be taken into account.

Figure 3:
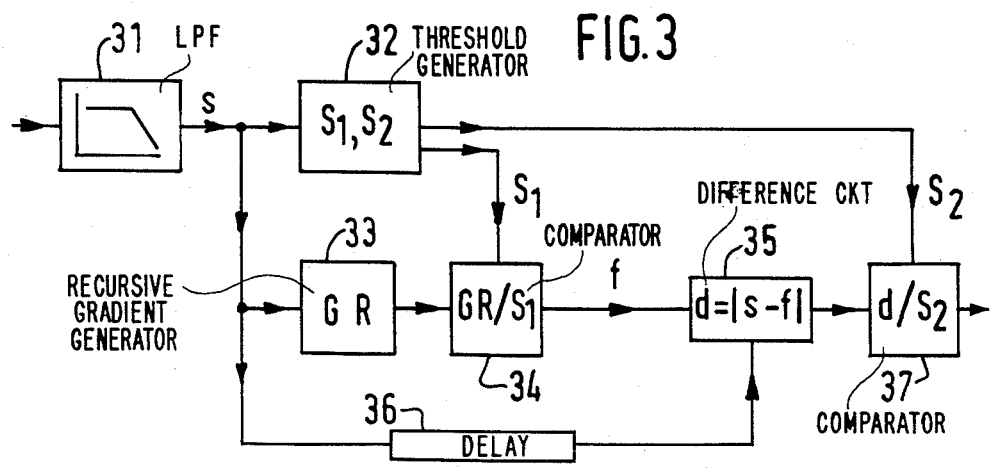
FIG. 3 is a block circuit diagram of an arrangement for putting the method according to the invention into effect.

FIG. 3 shows in diagrammatic form an arrangement for putting the extraction procedure described with reference to FIGS. 1 and 2, into effect. The video input level is first prefiltered by means of a low-pass filter 31.

The prefiltered video signal s(i,j) is thereafter utilised to calculate, on the one hand, at 32, the two thresholds $S_1$ and $S_2$ and on the other hand, at 33, the recursive gradient GR(i,j). The recursive gradient GR(i,j) is compared to the background estimation threshold $S_1$ by means of a comparator 34. The result of this comparison renders it possible to evaluate a value of the estimated background f(i,j). The difference d(i,j) between the video signal s(i,j) delayed by a delay line 36 and the estimated background f(i,j) is determined at 35. A second comparator 37 compares the absolute value of the difference d(i,j) to the decision threshold $S_2$, the result of this comparison produces a binary output signal 1 or 0, depending on whether the picture element considered is recognized or not recognized as belonging to the object to be extracted.

Figure 4:
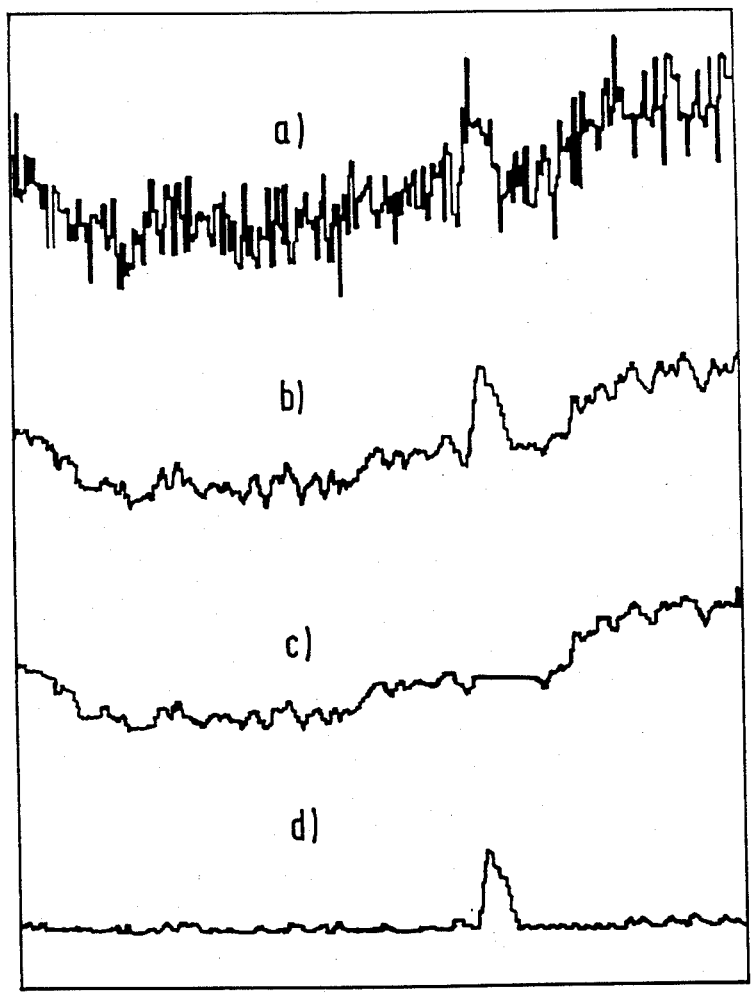
FIG. 4 is a graph illustrating an experimental result obtained by applicants with the aid of the procedure according to the invention.

FIG. 4 is a graph of an experimental example of extracting a contrasting object in a digital image obtained by applicants with the aid of the procedure according to the invention. The Figure is a unidimensional representation along a line or a column intersecting the object to be extracted. At (a) the initial video level is shown from which the prefiltered signal s(i,j) given at (b) is obtained. The estimated background f(i,j) is obtained at (c). Finally, the difference between the prefiltered signal and the estimated background is shown at (d).

What is claimed is:

1. A method for extracting a contrasting object in a digital image comprising:

estimating for each picture element (i,j) a threshold $S_1$ corresponding to a background estimation threshold representative of an image contrast;

determining a local contrast function (GR(i,j)) as a recursive gradient proportional to the absolute difference between an average (MV(j)) of the video signals on the line j of said picture element (i,j) and a function (MF(j), MF(j−1)) of the averages MF(j) and MF(j−1) of the estimated backgrounds in picture elements located on at least one identical line (j) or a line (j−1) preceding the line (j) on which the relevant picture element is located;

determining an estimated background value (f(i,j)) for each element by comparing to said threshold said local contrast function (GR(i,j)) calculated for each picture element (i,j);

determining the difference (d(i,j)) between the video signal (S(i,j)) and the estimated background (f(i,j)); and, comparing said difference (d(i,j)) to a second decision threshold ($S_2$) to determine whether said picture element belongs to said contrasting object.

2. A method as claimed in claim 1, wherein when said recursive gradient (GR(i,j)) exceeds the background estimation threshold ($S_1$), the estimated background (f(i,j)) for the relevant picture element (i,j) is expressed as a function of the average values (MF(j); MF(j−1)) of the estimated backgrounds utilized in the calculation of the recursive gradient, and when said recursive gradient (GR(i,j)) is less than the background estimation threshold ($S_1$), the background (f(i,j)) estimated for the relevant picture element (i,j) is taken equal to a linear combination of the video signal (s(i,j)) of the relevant picture element (i,j) and average values (MF(j); MF(j−1)) of the estimated backgrounds utilized in the calculation of the recursive gradient.

3. A method as claimed in claim 2, wherein if the recursive gradient (GR(i,j)) exceeds the background estimation threshold ($S_1$) the background (f(i,j)) estimated for the relevant picture element (i,j) is set equal to one of said average values (MF(j); MF(j−1)) of the estimated backgrounds which have the highest difference in absolute value with respect to the video signal (s(i,j)) of the relevant picture element.

4. A method as claimed in claim 2, wherein, when the recursive gradient (GR(i,j)) is less than the background estimation threshold ($S_1$), the background (f(i,j)) estimated for the relevant picture element (i,j) is taken equal to the average value between the video signal (s(i,j)) of the relevant picture element and that one of said average values (MF(j); MF(j−1)) of the estimated backgrounds having the smallest difference in absolute value with respect to the video signal (s(i,j)) of the relevant picture element.

5. A method as claimed in claim 2, wherein said recursive gradient is calculated at the left (GRG(i,j)) with the aid of at least one average value (MFG(j)) of the estimated backgrounds in the left-hand picture elements, preceding the relevant picture element (i,j) and located in the same line (j), and at the right (GRD(i,j)) with the aid of at least one average value (MFD(j)) of the estimated backgrounds in right-hand picture elements, subsequent to the relevant picture element (i,j) and located in the same line (j), each left-hand recursive gradient (GRG(i,j)) and right-hand recursive gradient (GRG(i,j)) defining an estimated background at the left (fg(i,j)) and an estimated background at the right (fd(i,j)), and the final background estimated for the relevant picture element (i,j) is taken equal to that one of these two estimated backgrounds at the left and at the right which has the smallest difference in absolute value with respect to the video signal (s(i,j)) of the relevant picture element (i,j).

6. A method as claimed in claim 2, wherein the initialisation of the calculation of said recursive gradient is effected by taking the values of the video signal as the value for the estimated backgrounds for the picture elements located in the first lines and the first and last columns of the image.

7. A method as claimed in claim 2, wherein the picture is divided into n sub-pictures which overlap each other only partially, the background estimation threshold ($S_1$) and the decision threshold ($S_2$) are proportional to an everage value (M) of these n sub-pictures of an average value ($m_k$, k=1, ..., n) in each sub-picture (k) having a value ($C_k(i,j)$) which is characteristic of the contrast in each of the picture elements (i,j) of the relevant sub-picture (k).

8. A method as claimed in any one of the claims 1 to 7, wherein the relevant video signal (s(i,j)) is the video input level prefiltered by means of a low-pass digital filter (31).

* * * * *